April 17, 1934.    W. BEUSCH    1,955,270
EXCESS DEMAND METER
Filed June 7, 1929
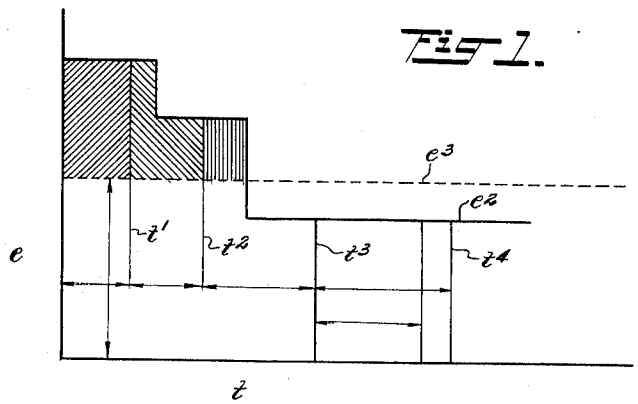
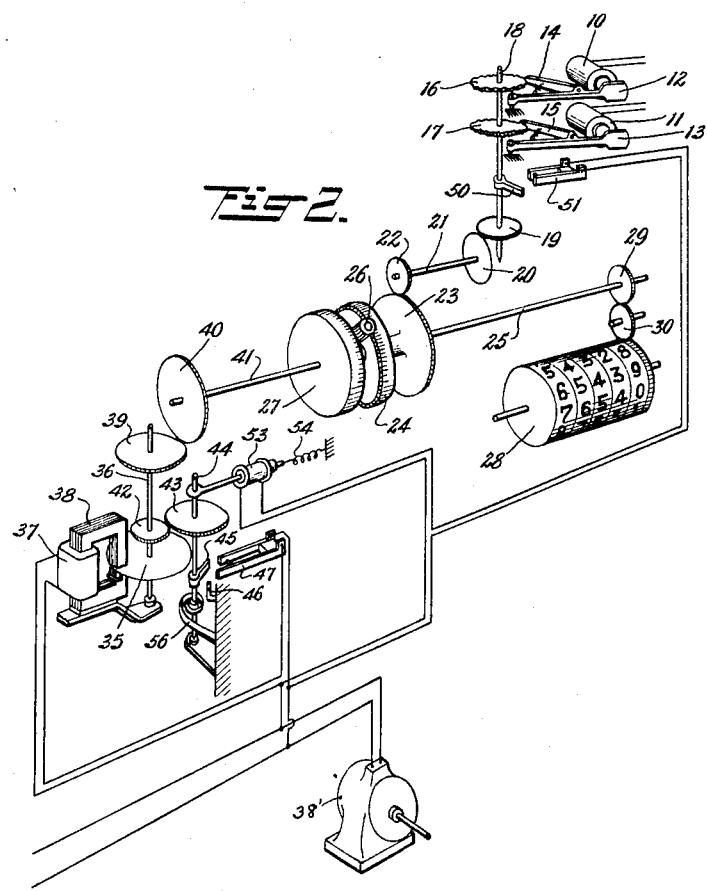
INVENTOR
W. Beusch.
BY John N Morgan
ATTORNEY Patented Apr. 17, 1934

1,955,270

UNITED STATES PATENT OFFICE 1,955,270

EXCESS DEMAND METER

Willi Beusch, Zug, Switzerland, assignor to Landis & Gyr, A-G., a joint-stock company of Switzerland Application June 7, 1929, Serial No. 369,101
In Switzerland June 16, 1928

10 Claims. (Cl. 171—34)

The present invention relates to excess demand meters by which any consumption of energy at more than a predetermined rate causes the excess demand to be registered. The present invention also provides a method and apparatus by which the energy consumption is registered only in case the demand for energy is maintained at an excessive rate while a predetermined quantity of energy is consumed.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serves to explain the principles of the invention.

Of the drawing:—

Fig. 1 is a load diagram showing the excess energy demand; and

Fig. 2 is a diagrammatic representation of the present preferred embodiment of the invention.

In the measurement of electrical energy, it is not only desirable to determine and register or record the total amount of energy consumed in one or several circuits, but it is also desirable to have a check upon the manner in which the energy is consumed so that any excessive demand for energy can be separately registered and made the basis of a separate charge. Under certain tariffs, the consumer is permitted to use energy not to exceed a definite rate for which he pays a low tariff, and in case the demand for energy temporarily exceeds this predetermined limit, a separate charge at a higher tariff is made for the energy consumed at the excessive rate. In this manner the load on the central station becomes more nearly uniform and temporary excessive demands are discouraged.

According to the present invention, means are provided for measuring the energy consumed in one or more circuits and for comparing the amount of energy so consumed with the definite and predetermined limit and for periodically registering the amount of energy consumed in excess of the predetermined limit when the excess demand is such that the average rate of consumption of a predetermined quantity of energy is in excess of the predetermined limit.

In the present preferred embodiment of the invention, means are provided for measuring the energy consumption in one or more separate circuits and for totalizing the energy consumption in these circuits. Means are also provided for reversely actuating the register at a constant speed and for limiting the amount of the reverse actuation during each metering period, each period being considered as the interval during which a definite quantity of energy is consumed, rather than as a definite period of time. The commencement of the metering periods is determined by, and the reverse actuation of the register is preferably controlled by the energy measuring means, so that a new period is commenced and the reverse actuating means for the register is reset each time the measuring means has measured a predetermined quantity of energy. Preferably, means are provided for interrupting the flow of energy through reverse actuating means for the register during the period the reverse actuating means is held against further movement.

It will be understood that the foregoing general description and the following detailed description as well are exemplary and explanatory of the invention but are not restrictive thereof.

Referring now in detail to the drawing illustrating the present invention in its preferred embodiment, the diagram in Fig. 1 shows the load conditions on a typical line, the time being plotted along the abscissa and energy along the ordinates. The stepped line $e^2$ represents the energy demand made on the central station, while the dotted line $e^3$ represents the registering limit. The shaded portion above the line $e^3$ represents the excess demand for which a separate and higher charge is made. The vertical lines $t^1$, $t^2$, $t^3$ and $t^4$ mark the ends of periods during which a predetermined amount of energy has been consumed, and, of course, the shorter these periods are, the greater is the amount of excess energy demand.

In Fig. 2 the present preferred embodiment of the invention is shown as applied for use with a summation meter in which the electromagnets 10 and 11 are intermittently energized each time the meters with which they are connected have measured a unit of energy. These electro-magnets cooperate with pivoted arms 12 and 13 carrying pawls 14 and 15 respectively, which engage with and move ratchet wheels 16 and 17 fixed on shaft 18. Each time one of the magnets is energized the ratchet wheels are stepped ahead one tooth and thereby indicate the consumption of a unit of energy. Shaft 18 carries at its lower end a bevel gear 19 meshing with bevel gear 20 mounted on shaft 21 which also carries pinion 22 meshing with gear 23, which is fast with respect to the differential gear 24 loosely journaled on shaft 25. Shaft 25 has fixed thereon an arm carrying differential pinion 26 meshing with differential gears 24 and 27, and as the energy is measured and ratchet wheels 16 and 17 are correspondingly advanced, differential pinion 26 revolves and carries shaft 25 with it, which in turn drives the registering mechanism 28 by means of pinions 29 and 30.

For moving the register in the opposite direction, to subtract therefrom the normal or permissible low tariff load there is preferably provided a constant speed motor which may comprise a conducting disc 35 rotatably mounted by shaft 36 and driven by the alternating magnetic field produced by the alternating current flowing in coil 37 surrounding core 38, and supplied from generator 38'. Shaft 36 also carries a beveled gear 39 meshing with beveled gear 40 fixed on shaft 41 and rigid with respect to differential gear 27. As disc 35 rotates in a clockwise direction, it effects a reverse movement of the differential pinion 26, which in turn causes a reserve movement of the register 28, thereby reducing the total shown by the register.

For limiting the extent of the rotation of the constant speed mechanism, to prevent subtraction of the energy consumed during a preceding interval from the register, shaft 36 carries a pinion 42 normally meshing with a gear 43 mounted on shaft 44. Shaft 44 carries a stop arm 45 cooperating with stop 46 and switch 47 in circuit with coil 37, so that after a predetermined number of revolutions, the current supplied to coil 37 is interrupted and the rotation of the disc ceases. By this means, no more than the predetermined amount can be subtracted from the total shown by the register.

Means are also provided for connecting the constant speed motor with the metering mechanism so that the constant speed motor limiting device can be reset to its initial position each time that the metering mechanism has measured a predetermined quantity of energy, and as embodied, ratchet shaft 18 carries an arm 50 which opens switch 51, once each revolution, thereby de-energizing solenoid 53 and allowing spring 54 to pull gear 43 out of mesh with pinion 42. When gear 43 is so moved spring 56 returns arm 45 to its initial position, closing switch 47 and allowing motor disc 35 to rotate again, and it continues its rotation until arm 45 opens switch 47 or until arm 50 opens switch 51.

In operation, the register 28 tends to be driven forwardly by the metering mechanism and reversely by the constant speed motor disc 35, these drives tending to neutralize each other in the differential 24, 26, 27. The drive from disc 55 may continue for a predetermined period of time until arm 45 engages switch 47, stopping the constant speed motor, unless an amount of energy in excess of normal load has been consumed and measured. In case of an excess demand, switch 51 is closed before switch 47 is opened, thereby energizing solenoid 53 and returning arm 45 and gear 44 to its original position and disc 35 does not stop. When the demand falls below normal, switch 47 is opened before switch 51 is closed, thereby stopping the motor disc 35 until the predetermined quantity of energy has been measured at which time solenoid 53 is energized, resetting arm 45 and restarting the motor disc 35.

The metering mechanism tends to actuate the totalizing register 28 in accordance with the energy consumed, but this registration is totally or partially wiped out by the constant speed motor which reversely drives the register, leaving only a registration of the excess demand. When the load exceeds the normal demand, only a proportional part of the registration is wiped out, the amount depending on the ratio which the period during which the predetermined quantity of energy was consumed bears to the period during which the same quantity would be consumed at normal load. With a normal or sub-normal demand, the reverse drive from the disc 35 completely neutralizes the drive from the metering mechanism, so that the total shown by the register 28 is not increased or decreased.

The invention in its broader aspects is not limited to the specific mechanisms shown and described but departures may be made therefrom within the scope of the accompanying claims without departing from the principles of the invention and without sacrificing its chief advantages.

What I claim is:

1. An excess demand register including in combination a constant speed motor, an energy meter, a differential driven by said motor and meter, a register driven by the differential, means for stopping the motor after a predetermined period and means for restarting the motor after a predetermined amount of energy has been consumed.

2. An excess demand register including in combination a constant speed motor, an energy meter, a differential driven by said motor and meter, a register driven by said differential when the speed of the motor is not equivalent to that of the meter, means for stopping the motor after a predetermined period, and means for restarting the motor after a predetermined amount of energy has been consumed and preventing operation of the motor stopping means when more than a predetermined quantity of energy is consumed in a predetermined period of time.

3. An excess demand register including in combination a constant speed motor, an energy meter, a differential driven by said motor and meter, a register driven by said differential, means for stopping the motor after a predetermined period and means for restarting the periods each time a predetermined quantity of energy has been consumed.

4. An excess demand registering mechanism including in combination a totalizing register, means tending to actuate said register in accordance with the total energy consumption, means actuated proportionately to time for reversely actuating said register and means for interrupting the reverse actuation of the register after a predetermined time and means for restarting said reverse actuating means each time a predetermined amount of energy has been consumed.

5. An excess demand registering mechanism including in combination a totalizing register, means tending to actuate said register in accordance with the total energy consumption in several circuits, time measuring means tending to reversely actuate said register and neutralize the effect of said first means, means for limiting the reverse actuation of the register and means controlled solely by energy consumption for resetting the time measuring means each time a predetermined amount of energy has been consumed.

6. An excess demand registering mechanism including in combination a totalizing register, an energy meter, a differential between said register and the meter and through which the meter drives the register, a constant speed motor tending to reversely drive said register through said differential, a stop for limiting said motor and means for restarting said motor after a predetermined quantity of energy has been consumed.

7. An excess demand registering mechanism including in combination a totalizing register, an energy meter, a differential between said register and the meter and through which the meter drives the register, a constant speed motor tending to reversely drive said register through said differential, a stop for limiting said motor, means for interrupting the energy supply to said motor after a predetermined period and means for restarting said motor each time a predetermined quantity of energy has been consumed.

8. An excess demand register including in combination a totalizing register, an energy meter, a constant speed motor, means for driving the register from the meter or for reversely driving the register by the motor, means for restarting a period to be measured by the motor each time a predetermined quantity of energy has been consumed and means for stopping the motor at the end of each period until a predetermined quantity of energy has been consumed, said last means being prevented from operating by the consumption of at least said predetermined quantity before the end of a period.

9. The method of measuring excess energy demand which includes actuating a totalizing register in accordance with excess energy consumption determined over a period of appreciable length and varying the length of said period in accordance with the energy consumption during the period.

10. The method of measuring excess energy demand which includes measuring energy consumption during a period, subtracting therefrom an amount proportional to the duration of said period, but never in excess of a predetermined maximum, actuating a totalizing register in accordance with the excess energy consumption during the period and varying the length of said period in accordance with the energy consumption during said period.

WILLI BEUSCH.